(12) United States Patent
Li et al.

(10) Patent No.: US 8,792,905 B1
(45) Date of Patent: Jul. 29, 2014

(54) LOCATION MONITORING USING CLUSTERS OF ENTITIES

(75) Inventors: Guanfeng Li, Fremont, CA (US); Hongji Bao, Beijing (CN); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/433,138

(22) Filed: Mar. 28, 2012

Related U.S. Application Data

(60) Provisional application No. 61/605,709, filed on Mar. 1, 2012.

(51) Int. Cl.
*H04W 24/00* (2009.01)
(52) U.S. Cl.
USPC ...................................................... 455/456.1
(58) Field of Classification Search
USPC ................................ 455/414.2, 456.1–456.3
See application file for complete search history.

(56) References Cited

U.S. PATENT DOCUMENTS

| | | | |
|---|---|---|---|
| 7,983,878 B1 | 7/2011 | Denis | |
| 2007/0091838 A1* | 4/2007 | Kobayashi et al. | 370/328 |
| 2008/0287143 A1 | 11/2008 | Banks et al. | |
| 2011/0040603 A1 | 2/2011 | Wolfe | |

* cited by examiner

*Primary Examiner* — Joel Ajayi
(74) *Attorney, Agent, or Firm* — McDermott Will & Emery LLP

(57) ABSTRACT

Systems, methods, and machine-readable media for monitoring the locations of a number of entities are provided. The system may be configured to track the locations of a multitude of entities by grouping entities together into clusters of entities based on their geographic proximity and trajectories. A member of a cluster may be identified as a leader or a follower. The system may receive a number of location reports for the entities and update the locations of the entities based on whether the entity is a leader or a follower. For example, the system may update a back-end location database with the location information for a leader while location updates for followers may be converted into locations that are relative to the corresponding leader's and cached at the system.

28 Claims, 8 Drawing Sheets

300

600

LOCATION MONITORING USING CLUSTERS OF ENTITIES

RELATED APPLICATION

This application claims priority to U.S. Provisional Patent Application No. 61/605,709, filed on Mar. 1, 2012, entitled "LOCATION MONITORING USING CLUSTERS OF ENTITIES," the entire contents of which are herein incorporated by reference in its entirety.

FIELD

The present disclosure generally relates to tracking the location of an entity and, in particular, tracking the location of a number of entities using location-aware devices.

BACKGROUND

In order to provide various location-based services to users, systems may be configured to monitor the location of one or more moving entities (e.g., users, mobile devices, or other objects able to be tracked) using location-aware devices (e.g., global positioning system (GPS) devices). Location-based services may receive location reports from location-aware devices associated with entities, update the location of the entities based on the location reports, and provide services using the location of the entities.

More and more devices (e.g., mobile phones, tablets, GPS devices, etc.) able to report locations to location-based services are being used. Furthermore, there has been an increase in the number of entities using location based services. Accordingly, location-based services are expected to handle an increasing number of location reports from capable devices and monitor the location of an increasing number of entities.

SUMMARY

Various aspects of the subject technology relate to a system for monitoring locations for a plurality of entities, each entity of the plurality of entities identified as a leader entity or a follower entity. The system may include one or more processors and a machine-readable medium comprising instructions stored therein, which when executed by the one or more processors, cause the one or more processors to perform operations. The operations may include receiving a location report for a first entity, the location report comprising location information for the first entity, determining whether the first entity is a leader entity or a follower entity, and updating a location database using the location information from the location report for the first entity if the first entity is a leader entity.

Various aspects of the subject technology relate to a computer-implemented method for monitoring locations for a plurality of entities, each entity of the plurality of entities identified as a leader entity or a follower entity. The method may include receiving a location report for a first entity, the location report comprising location information for the first entity and an entity identifier for the first entity, searching an affiliation table using the entity identifier to determine whether the first entity is a leader entity or a follower entity, and transmitting the location information in the location report for the first entity to a location database to be stored if the first entity is a leader entity.

Various aspects of the subject technology relate to a machine-readable medium including instructions stored therein, which when executed by a machine, cause the machine to perform operations for monitoring locations for a plurality of entities, each entity of the plurality of entities identified as a leader entity or a follower entity. The operations may include receiving a location report for a first entity, the location report comprising location information for the first entity and an entity identifier for the first entity, searching an affiliation table using the entity identifier to determine whether the first entity is a leader entity or a follower entity, and transmitting, via a network, the location information in the location report for the first entity to a location database to be stored if the first entity is a leader entity.

Some aspects of the subject technology relate to a system for forming a cluster of entities. The system may include one or more processors and a machine-readable medium comprising instructions stored therein, which when executed by the one or more processors, cause the one or more processors to perform operations. The operations may include identifying a first leader entity associated with a first cluster and a second leader entity associated with a second cluster within a geographic proximity, determining a first trajectory for the first leader entity and a second trajectory for the second leader entity, comparing the first trajectory with the second trajectory, and, if a difference between the first trajectory and the second trajectory is less than a threshold trajectory difference, merging the first cluster associated with the first leader entity and the second cluster associated with the second leader entity.

Some aspects of the subject technology may relate to a computer-implemented method for forming a cluster of entities. The method may include identifying, in a geographic region, a first leader entity associated with a first cluster and a second leader entity associated with a second cluster, determining a first trajectory for the first leader entity and a second trajectory for the second leader entity, comparing the first trajectory with the second trajectory, and, if a difference between the first trajectory and the second trajectory is less than a threshold trajectory difference, combing the first cluster associated with the first leader entity and the second cluster associated with the second leader entity.

Some aspects of the subject technology may relate to a machine-readable medium comprising instructions stored therein, which when executed by a machine, cause the machine to perform operations for forming a cluster of entities. The operations may include identifying a plurality of leader entities in a region, wherein each leader entity is associated with a cluster and a trajectory, comparing a first trajectory of a first leader entity of the plurality of leader entities with a second trajectory of a second leader entity of the plurality of lead entities, and, if a difference between the first trajectory and the second trajectory is less than a trajectory deviation value, merging a first cluster associated with the first leader entity with a second cluster associated with the second leader entity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
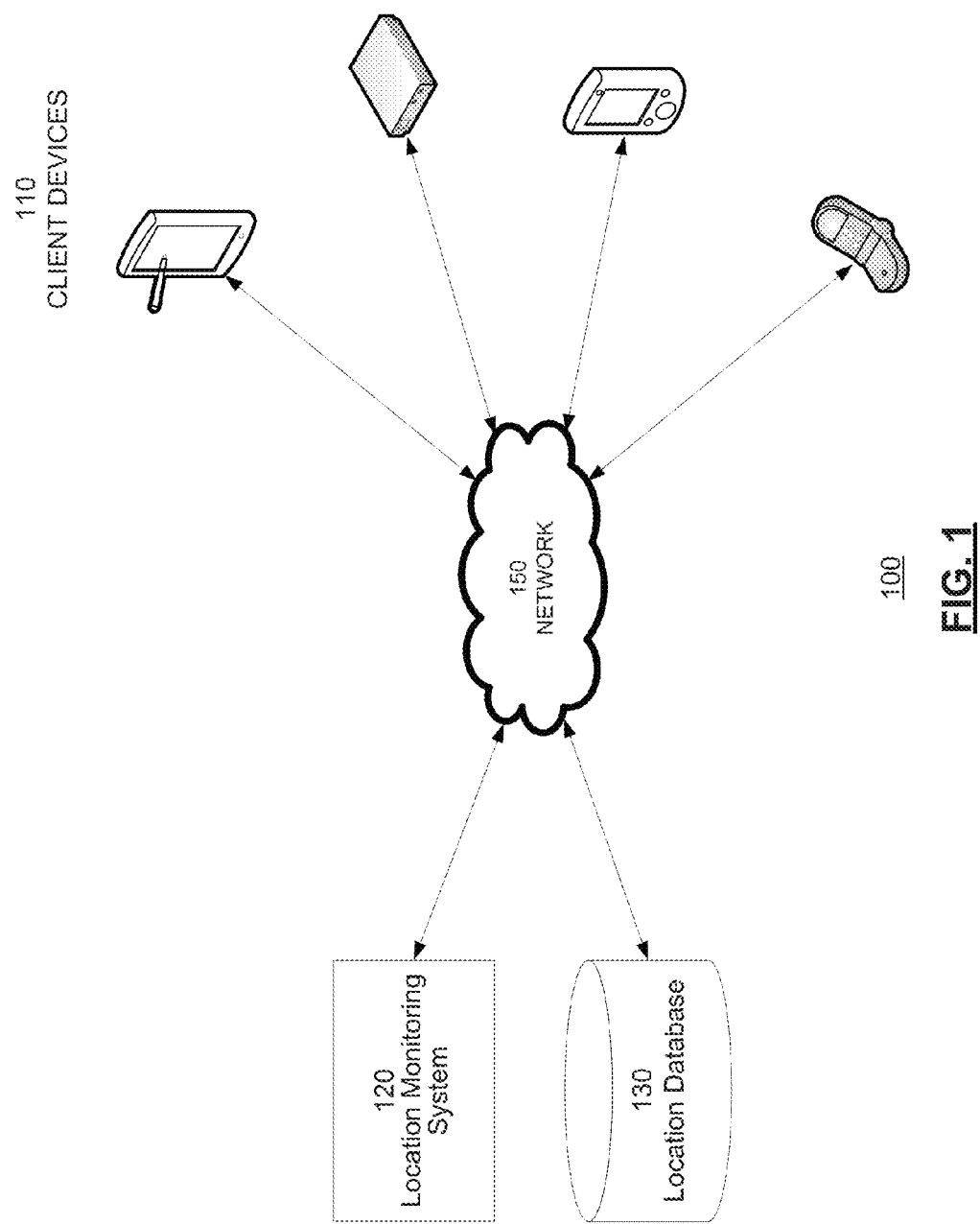
FIG. 1 is a block diagram illustrating an example network environment in which locations of a number of entities may be monitored, in accordance with one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, systems and methods for monitoring the locations of a number of entities are provided. A system may be configured to track the locations of a multitude of entities by grouping entities together into clusters or schools based on their geographic proximity and similar trajectories (e.g., similar velocities). For example, a number of users with location-aware devices may be riding on a bus, train, subway, boat, airplane, or other mode of mass transit. Additionally, the unit of mass transit (e.g., busses, taxis, trains, boats) that the users are riding may also have location-aware devices installed or on board. These entities are generally located within a certain distance of one another and are moving at the same or similar velocity (e.g., speed and direction). As a result, these entities may be grouped together into a cluster. In another example, cars on a road or highway may also be traveling near one another with the same velocity and may also be clustered together into a cluster.

By grouping entities into clusters, the system may reduce the resources (e.g., bandwidth, processing power, etc.) needed to update and query location information for members of the cluster. For example, the similarity in location and velocity of entities in a cluster may be used to reduce the number of updates to a back-end location database that keeps track of the current locations for a number of entities as well as, in some aspects, location histories for a number of entities.

According to one aspect, one of the entities in the cluster may be selected as a leader either randomly or based on a predefined metric and the location of the other entities in the cluster (e.g., the followers) may be calculated in relation to the leader. To reduce the number of updates to the location information of the entities and reduce latency, the system may update the back-end location database with the location information for a leader while location updates for followers may be converted into locations that are relative to the corresponding leader's and cached at the system (e.g., stored at on a local cache). The relative location of a follower may be calculated, in one aspect, as a displacement value (e.g., a distance from the leader) and a displacement direction (e.g., a direction away from the leader).

FIG. 1 is a block diagram illustrating an example network environment 100 in which the locations of a number of entities may be monitored, in accordance with one aspect of the subject technology. The network environment 100 includes one or more client devices 110, one or more servers hosting a location monitoring system 120, and a location database 130 all connected over a network 150 (e.g., the Internet). Although FIG. 1 illustrates a client-server network environment 100, other aspects of the subject technology may include other configurations.

The client devices 110 may include, for example, mobile devices (e.g., a smart phone or a global positioning system (GPS) device), mobile computers, tablet computers, or any other location-aware devices. The client devices 110 may be configured to determine their location (e.g., location coordinates) and report their location coordinates to the location monitoring system 120.

The location monitoring system 120 may be any system or device having a processor, a memory, and communications capability for monitoring the location of a number of entities. For example, the location monitoring system 120 may be able to receive location reports from client devices 110 and use the location reports to update the location of the entities associated with the client devices 110.

The location monitoring system 120 may store the location of the entities at a local cache, in a location database 130, or on another memory device. However, in some cases, the location database 130 may only be able to handle a limited number of location updates in a given period of time. In order to reduce the load on the location database 130, in certain circumstances, the location monitoring system 120 may store the location information from location reports at the local cache instead.

Figure 2:
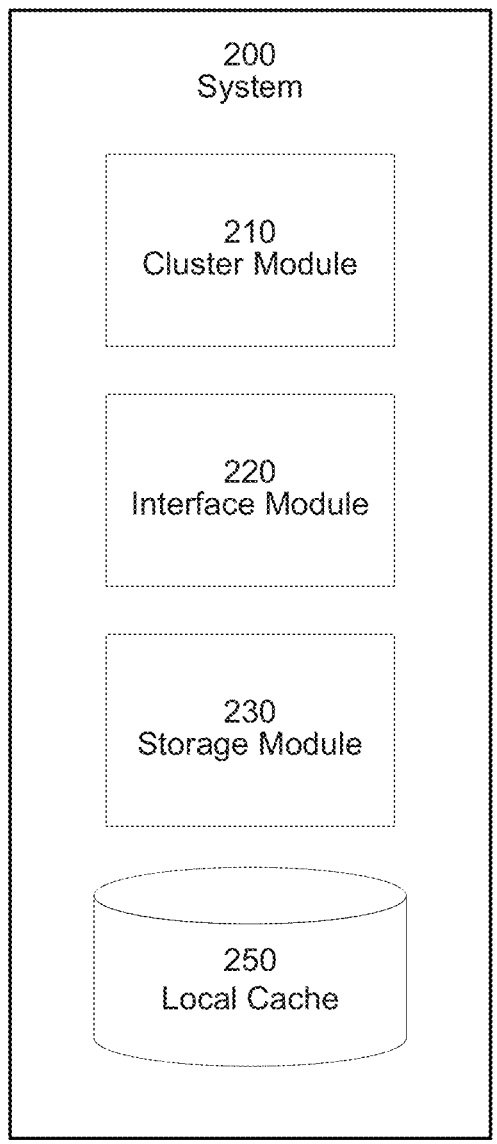
FIG. 2 is a conceptual block diagram illustrating an example system for monitoring locations for a number of entities, in accordance with one aspect of the subject technology.

FIG. 2 is a conceptual block diagram illustrating an example system 200 for monitoring locations for a number of entities, in accordance with one aspect of the subject technology. The system 200 may be hosted on one or more of servers in FIG. 1 together or separate from the location database 130.

The system 100 may include a cluster module 210, an interface module 220, a storage module 230, and a local cache 250. While the system 200 is shown in one configuration in FIG. 2, in other configurations, the system 200 may include additional, alternative, and/or fewer components. For example, according to one aspect of the subject technology, the system 200 may further include a location database 130. However, in other aspects, the location database 130 may be hosted on a separate server or group of servers that are accessible via a network (e.g., the Internet or an intranet).

The system 200 may monitor the locations for a number of entities by grouping entities together into clusters (e.g., groups of entities). For example, the cluster module 210 may be configured to form clusters of entities, add members to the clusters, remove members from the clusters, merge two or more clusters together, determine whether an entity in a cluster is a leader entity or a follower entity, or perform any other cluster management task.

The cluster module 210 may also store information related to the clusters being monitored by the system 200 such as which entities are members of a cluster and whether the entities are leader entities or follower entities of the cluster. In one aspect, this information may be stored in an affiliation table, as will be discussed in further detail below.

Figure 3:
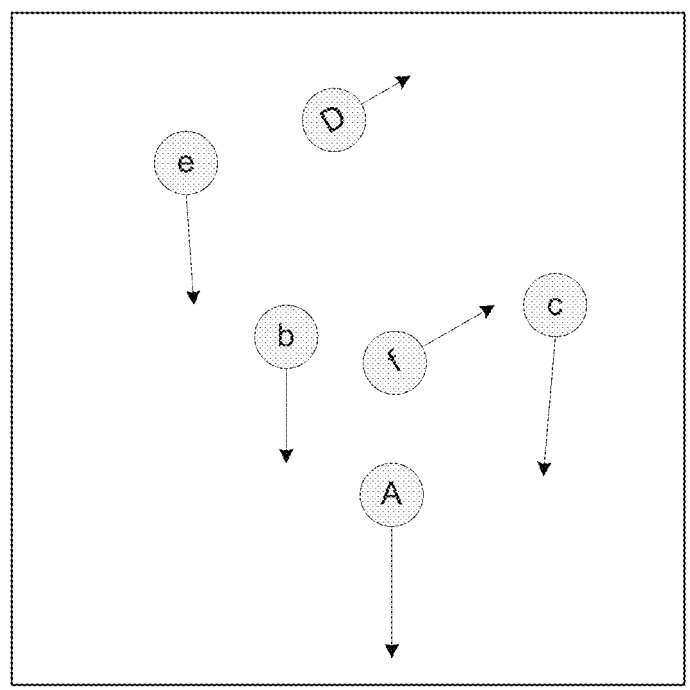
FIG. 3 is a diagram that illustrates example clusters of entities, in accordance with one aspect of the subject technology.

FIG. 3 is a diagram 300 that illustrates example clusters of entities, in accordance with one aspect of the subject technology. The diagram may include a number of entities that are located in close proximity with one another. Each entity may also be associated with a trajectory that is represented in FIG. 3 as a vector.

The entities may include one or more leader entities (e.g., entities A and D) and follower entities (e.g., entities b, c, e, and f). In FIG. 3, entities b, c, and e are followers of leader entity A because the entities are within a threshold distance of one another and have similar trajectories (e.g., their respective vectors are of similar magnitude and direction). Similarly, entity f is a follower of leader entity D because they are also within a certain distance of one another and have similar trajectories.

Referring back to FIG. 2, the interface module 220 may be configured to receive location reports from a number of client devices 110. Each location report may be associated with an entity and include location information (e.g., location coordinates) for the associated entity. The location information contained in the location reports may be used to update the location of entities tracked by the system 200.

In one aspect, the storage module 230 may store location information from a location report in a local cache 250, a location database 130, or both depending on whether an entity is a follower entity or a leader entity. For example, the cluster module 230 may determine whether the entity associated with a location report is a leader entity or a follower entity. If the entity is a leader entity, the storage module 230 may update the stored location information for the leader entity in the location database 130 using location information from the location report.

If, on the other hand, the entity associated with the location report is a follower entity, the storage module 230 may update the stored location information for the follower entity in the local cache 250 instead of the location database 130, thereby saving an update operation to the location database 130. Further details and aspects of the subject technology are discussed below.

Clustering Entities

Figure 4:
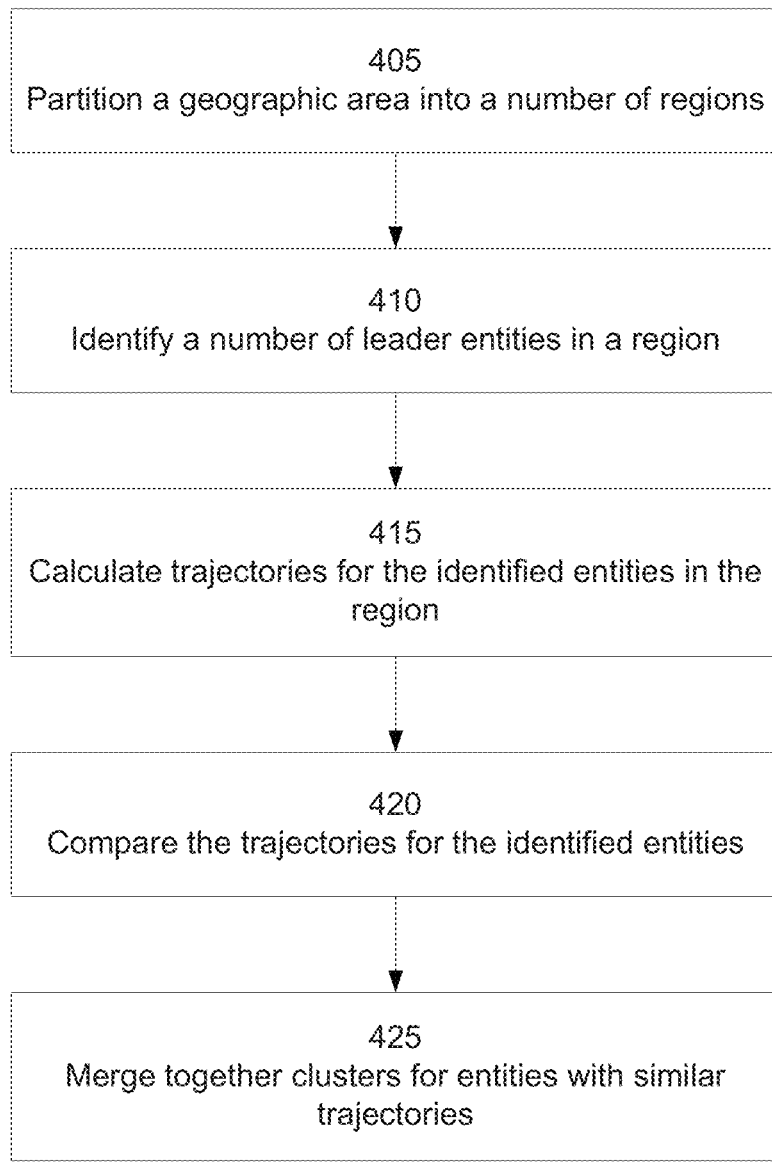
FIG. 4 is a flow chart illustrating an example process for grouping entities, in accordance with various aspects of the subject technology.

FIG. 4 is a flow chart illustrating an example process 400 for grouping entities, in accordance with various aspects of the subject technology. Although the steps in FIG. 4 are discussed with respect to the components of system 200 illustrated in FIG. 2, the steps are not limited to these modules. Furthermore, although the steps are shown in one particular order, additional steps, fewer steps, or other orderings of the steps are also possible.

According to one aspect of the subject technology, the cluster module 210 may create a cluster of entities by grouping entities that are near one another and have similar trajectories. This grouping or clustering of entities in a geographic area may occur periodically or in response to an event or command. The cluster module 210 may group together two or more single entities, a cluster of entities with a single entity, or two or more clusters of entities and store information about the clusters in an affiliation table.

The affiliation table may be used to manage and keep track of the clusters of entities being managed by the cluster module 210. According to one aspect, the affiliation table may have an entry for each entity tracked by the system 200 that may indicate whether an entity is a leader entity and a follower entity. If the entity is a follower entity, the entry may indicate which leader entity the follower entity is associated with. Conversely, if the entity is a leader entity, the entry may identify follower entities associated with the leader entity, if any.

To group entities together, the cluster module 210 may, at step 405, partition a geographic area into a number of regions. In each region, the cluster module 210 may identify a number of leader entities at step 410. The leader entities that are found in the same region may be considered in geographic proximity with one another.

A leader entity may be an entity in a cluster that is identified as a leader rather than a follower in the affiliation table. In one aspect, every entity may be associated with a cluster and if the cluster has only one entity as a member, that entity is the leader entity for that cluster. In other words, an entity that is not associated with other entities (e.g., an independent entity) may be considered "leader" of a cluster with only one entity.

Figure 5:
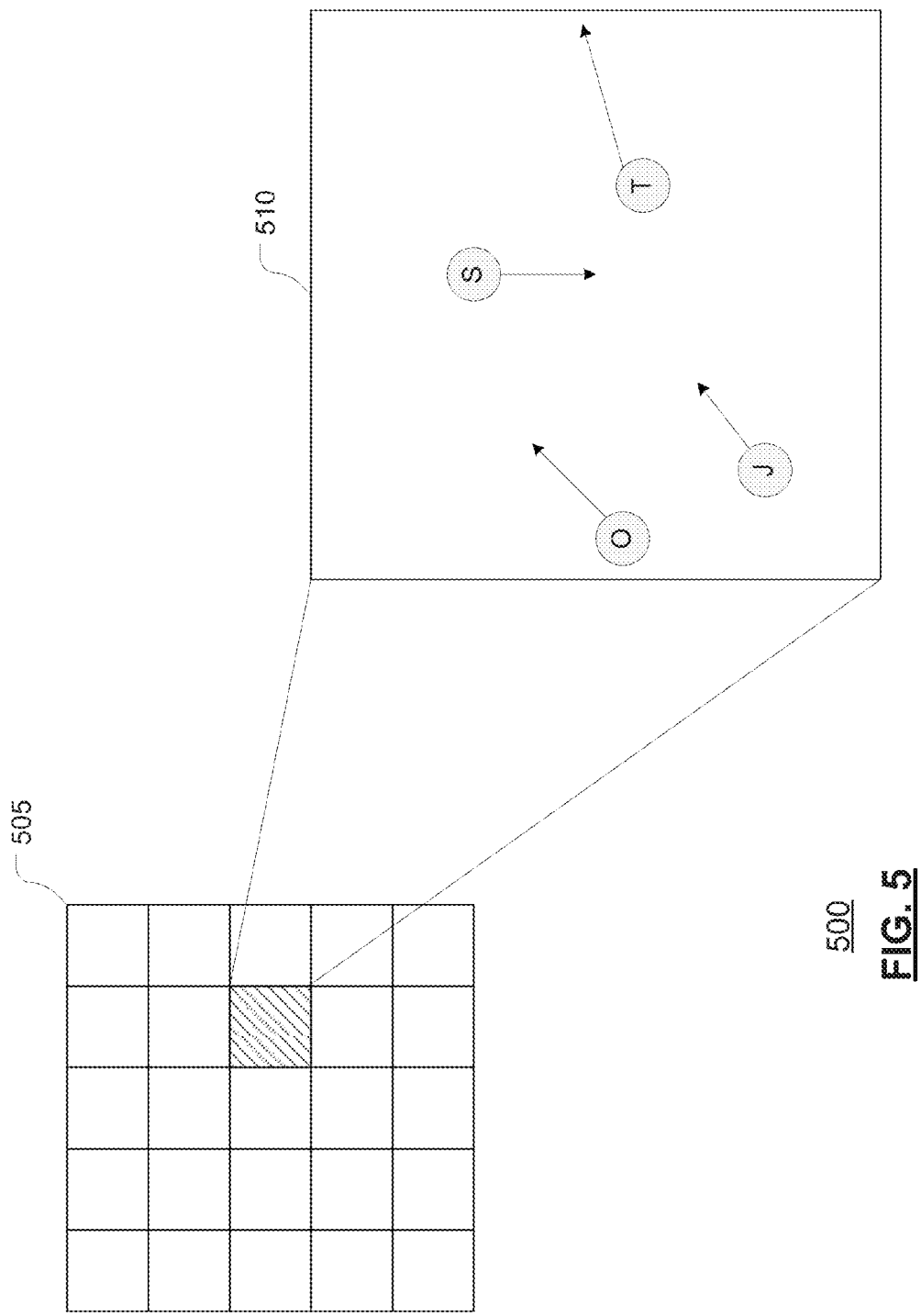
FIG. 5 is a diagram that illustrates example regions, in accordance with one aspect of the subject technology.

FIG. 5 is a diagram 500 that illustrates example regions, in accordance with one aspect of the subject technology. In FIG. 5, a geographic area 505 is partitioned into a number of regions. For each region in the geographic area 505, the cluster module 210 may identify leader entities (e.g., entities that are not followers of another entity).

For example, FIG. 5 shows a region 510 with a number of leader entities. The region may include leader entities that are associated with a follower entities belonging to their respective cluster (e.g., entities J, O, and T) and leader entities that do not have any follower entities (e.g., entity S). Although the leader entities J, O, and T have follower entities, the follower entities are not shown in FIG. 5 for the sake of clarity. Because entities J, O, T, and S are found in the same region 510, they are considered within a close geographic proximity of one another.

Once the entities are identified, the cluster module 210 may calculate the trajectories of the identified entities at step 415. In one aspect, the trajectories of the identified entities may be calculated by accessing a location history for each of the entities and determining a path that the entity has taken. In the example illustrated in FIG. 5, the trajectory for an entity is a velocity (e.g., the speed and direction of movement) represented by a vector, however, in other aspects, the trajectory for an entity may be more complex (e.g., a path traveled by the entity in a given period of time).

At step 420, the cluster module 210 may compare the trajectories of the identified entities and, at step 425, merge together the clusters for entities with similar trajectories. Two trajectories may be considered similar if the difference between the trajectories is less than a threshold trajectory difference.

Figure 6:
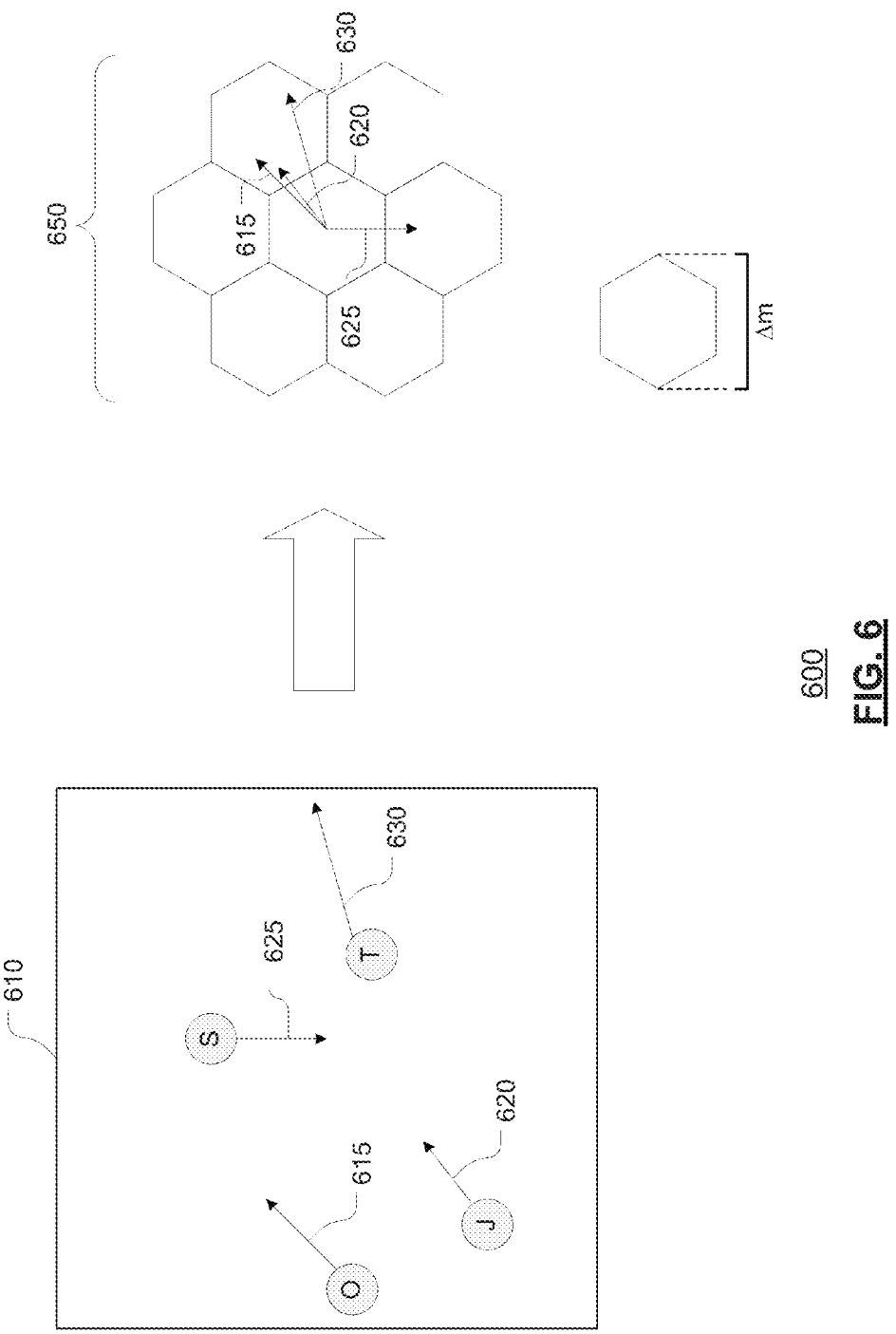
FIG. 6 is a diagram that illustrates an example region with a number of identified leader entities and their respective trajectories, in accordance with one aspect of the subject technology.

In one example, FIG. 6 is a diagram 600 that illustrates an example region 610 with a number of identified leader entities (entities J, O, S, and T) and their respective trajectories, in accordance with one aspect of the subject technology. In FIG. 6, the trajectory for each entity may be measured in terms of a velocity (e.g., a speed in a particular direction), however, any other measurement of entity position over time also may be used. The velocities for the entities J, O, S, and T in FIG. 6 are represented by vectors 615, 620, 625, and 630 and the velocities of the entities may be considered similar if the value of their vector difference is less than a threshold vector difference (e.g., the maximum threshold velocity deviation allowed).

One method of determining whether the velocities of the entities are similar is to partition a velocity space 650 into a number of identical hexagons with a maximum diameter equal to the threshold vector difference ($\Delta m$) which ensures that the maximum difference between two vectors that end in the same hexagon is less than the threshold vector difference ($\Delta m$). The vectors representing the velocities for the entities in region 610 may be placed in at the center of the velocity space 650 and mapped to one or more of the hexagons in the velocity space 650 as shown in FIG. 6.

The entities corresponding to vectors mapped to the same hexagon may be considered to have similar trajectories. For example, in FIG. 6, vectors 615, 620, and 630 (which correspond to entities J, O, and T) are all mapped to the same hexagon. Accordingly, entities J, O, and T (and their respective clusters) are considered to have similar trajectories and may be grouped or merged together into one cluster.

Merging together clusters may occur in various ways. According to one aspect, in the case where one leader entity associated with a number of follower entities is merged with a second entity associated with a number of follower entities, the second leader entity and the followers of the second leader entity may be added as followers of the first leader entity. A record of the merging of the clusters may be stored in the affiliation table. For example, the cluster module 210 may update the affiliation table to indicate that the second leader entity and the followers of the second leader entity are followers of the first entity (which may already have follower entities in the affiliation table).

In the case where one leader entity that is not associated with any follower entities is merged with another leader entity that is not associated with any follower entities, they may be grouped together into one cluster. One leader entity may be selected to be the leader of the cluster while the other will be selected as the follower of the leader and the selections may be recorded in the affiliation table. Which entity is to be the leader entity and which entity is to be the follower entity in the affiliation table may be determined randomly or according to a set of factors.

Furthermore, where a leader entity associated with a number of follower entities is merged with a leader entity that is not associated with any follower entities, the leader entity that is not associated with any follower entities may become a follower entity of the leader entity associated with a number of follower entities.

Monitoring Location Updates

Referring back to FIG. 2, the system 200 may also be configured to receive location reports from a number of location-aware devices (e.g., client devices 110 in FIG. 1) and use the location reports to update the location of a number of entities being monitored by the system 200. Each location report may include an entity identifier (e.g., a unique ID, a user name, etc.) that indicates the entity associated with the location report and location information (e.g., location coordinates) indicating the location of the entity. In some cases, the location report may also include a timestamp indicating a time and date of when the location information for the entity was obtained.

The system 200 may treat location reports for leader entities differently from location reports for follower entities. For example, according to one aspect of the subject technology, the interface module 220 may receive a location report for an entity from a location-aware device over a network such as the Internet. The cluster module 210 may determine whether the location report is for a follower entity or a leader entity (e.g., an entity that is a leader of other entities in a cluster or an entity that is the only entity in a cluster) be looking up the entity identifier in the location report in the affiliation table. If the location report is for a leader entity, the storage module 230 may update an entry for the leader entity in a back-end location database using location information contained in the location report.

On the other hand, if the location report is for a follower entity, the storage module 230 may calculate a relative location for the follower entity and store the relative location for the follower in a location table at the local cache 250 instead of the back-end location database. The relative location may be calculated by comparing the location information in the location report for the follower entity and the location information for the leader entity retrieved from the local cache 250 or the back-end location database and calculating a displacement (e.g., a distance and a direction) from the location information for the follower entity to the location information for the leader entity.

By storing the relative location for a follower entity at the local cache 250 instead of the back-end location database, the system 200 may reduce the number and frequency of updates to the back-end location database.

Figure 7:
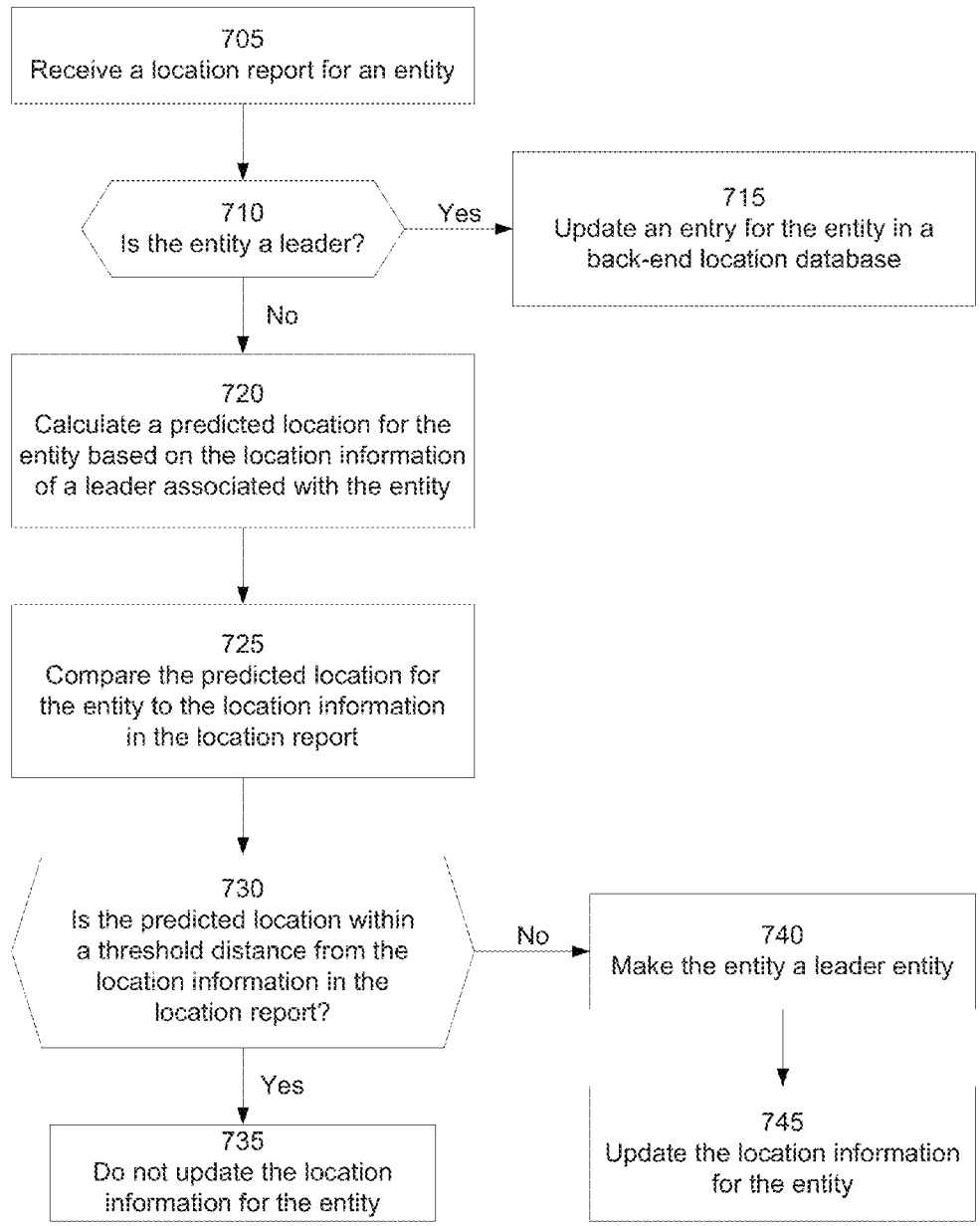
FIG. 7 is a flow chart illustrating an example process for updating the location of an entity, in accordance with various aspects of the subject technology.

According to another aspect of the subject technology, however, location reports for a follower entity may be dropped or discarded in certain circumstances. For example, FIG. 7 is a flow chart illustrating an example process 700 for updating the location of an entity, in accordance with various aspects of the subject technology. Although the steps in FIG. 7 are discussed with respect to the components of system 200 illustrated in FIG. 2, the steps are not limited to these modules. Furthermore, although the steps are shown in one particular order, additional steps, fewer steps, or other orderings of the steps are also possible.

At step 705, the interface module 220 may receive a location report associated with an entity that includes location information and an entity identifier. At step 710, the cluster module 210 may determine whether the entity associated with the location report is a leader entity by searching an affiliation table for the entity identifier. If the entity is a leader entity, the storage module 230 may update an entry for the entity in a back-end location database.

If the entity is a follower entity, the storage module 230 may determine whether the location report may be discarded by first calculating a predicted location for the follower entity of where the system 200 expects the follower entity to be based on previous location reports. The predicted location for the follower entity may be calculated by, for example, identifying the leader associated with the follower entity using the affiliation table and determining the leader entity's current location by looking up a location table in the local cache or back-end database. The storage module 230 may also retrieve, from the location table at the local cache 250, the follower entity's displacement (e.g., a distance and a direction) from the location of the leader entity. Finally, the predicted location may be obtained by applying the follower entity's displacement to the leader entity's current location.

After the predicted location is calculated, at step 725, the storage module 230 may compare the predicted location for the follower entity with the location information in the location report. At step 730, if the predicted location for the follower entity is within a threshold distance of the location information in the location report received by the interface module 220, at step 735, the storage module 230 may not need to use the location report to update the location of the follower entity since the predicted location is still accurate. Instead, the storage module 230 may discard the location report.

If, on the other hand, the distance between the predicted location for the follower entity and the location information in the location report exceeds the threshold distance, the follower entity may be considered to have left the cluster. Accordingly, the storage module 230 may convert the entity associated with the location report into a leader entity of a new cluster containing no other follower entities (e.g., make the entity a leader in the affiliation table) at step 740 and update the location information for the entity associated with the location report at the back-end location database at step 745.

Various examples of using location information, location coordinates (e.g., global positioning system (GPS) coordinates), and devices have also been described. However, one or more other technologies may be used in addition to or instead of GPS to determine location coordinates representing a geographic location. For example, location information may be obtained by identifying one or more cell towers that a mobile device may detect or detecting one or more wireless networks with known locations within range of the mobile device. Thus, it should be understood that location coordinates can be used to monitor the location of one or more entities as discussed herein to regardless of the technology or technologies used to determine the location coordinates.

Regardless of how location data is obtained, appropriate efforts may also be taken to protect privacy rights of the entities. For example, collection of location data may be on an opt-in basis so that data is not collected unless the entity has granted permission, with the location data stored and handled in a secure manner. Additionally, steps can be taken to anonymize the location data (e.g., to ensure that the location data cannot be tied to a particular entity and/or to a particular device).

Figure 8:
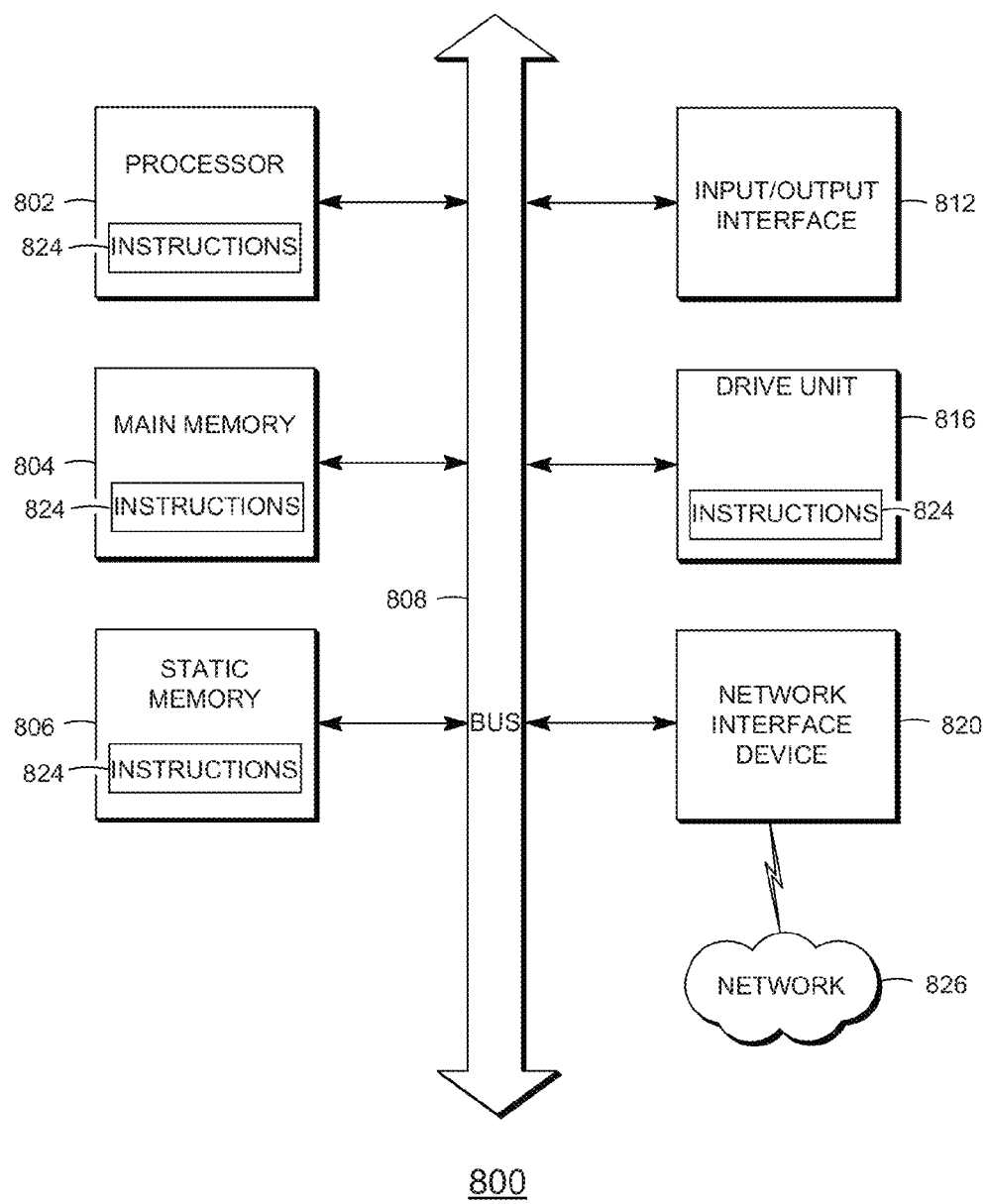
FIG. 8 is a block diagram illustrating an example computer system with which any of the client devices or systems described herein may be implemented.

FIG. 8 is a block diagram illustrating an example computer system 800 with which any of the client devices or systems described herein may be implemented. In certain aspects, the computer system 800 may be implemented using hardware or a combination of software and hardware, either in a dedicated server, or integrated into another entity, or distributed across multiple entities.

The example computer system 800 includes a processor 802, a main memory 804, a static memory 806, a disk drive unit 816, and a network interface device 820 which communicate with each other via a bus 808. The computer system 800 may further include an input/output interface 812 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 802 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 824 embodying any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media. The instructions 824 may further be transmitted or received over a network 826 via the network interface device 820.

The machine-readable medium may be a single medium or multiple media (e.g., a centralized or distributed database, and/or associated caches and servers) that store the one or more sets of instructions. The machine-readable medium may comprise the drive unit 816, the static memory 806, the main memory 804, the processor 802, an external memory connected to the input/output interface 812, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for monitoring the locations of a number of entities are provided. The system may be configured to track the locations of a multitude of entities by grouping entities together into clusters of entities based on their geographic proximity and trajectories. Members of the cluster may be identified as leaders or followers. To reduce the number of updates to the location information of the entities and reduce latency, the system may update a back-end location database with the location information for a leader while location updates for followers may be converted into locations that are relative to the corresponding leader's and cached at the system.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for monitoring locations for a plurality of entities that are grouped into a plurality of clusters, the method comprising:
   receiving a location report for a first entity, the location report comprising location information for the first entity and an entity identifier for the first entity;
   searching an affiliation table using the entity identifier to determine whether the first entity is a leader entity or a follower entity;
   transmitting the location information in the location report for the first entity to a location database to be stored when the first entity is the leader entity; and
   storing, in a local cache, displacement information for the first entity that is indicative of a location of the first entity relative to an associated leader entity when the first entity is the follower entity, the displacement information being determined based at least in part on the location information in the location report and leader location information for the associated leader entity.

2. The computer-implemented method of claim 1, wherein when the first entity is the follower entity, the method further comprises:
   identifying the associated leader entity that is associated with the first entity;
   determining the leader location information for the associated leader entity; and
   calculating the displacement information for the first entity based on the leader location information for the associated leader entity and the location information in the location report for the first entity.

3. The computer-implemented method of claim 1, wherein when the first entity is the follower entity, the method further comprises:
   receiving another location report for the first entity, the another location report comprising another location information for the first entity and the entity identifier for the first entity;
   identifying the associated leader entity that is associated with the first entity;
   retrieving the leader location information for the associated leader entity and the displacement information for the first entity;
   calculating a predicted location for the first entity based on the leader location information for the associated leader entity and the displacement information for the first entity;
   comparing the predicted location for the first entity and another location indicated by the another location information in the another location report for the first entity; and
   when a distance between the predicted location for the first entity and the another location for the first entity exceeds a threshold distance, converting the first entity into another leader entity and transmitting the another location information in the location report for the first entity to the location database.

4. The computer-implemented method of claim 3, wherein when the distance between the predicted location for the first entity and the another location for the first entity does not exceed the threshold distance, the method further comprises:
   discarding the another location report for the first entity.

5. The computer-implemented method of claim 3, wherein the displacement information for the first entity is calculated based on the leader location information for the associated leader entity and the location information in the location report for the first entity.

6. The computer-implemented method of claim 3, wherein retrieving the displacement information for the first entity comprises retrieving the displacement information from the local cache.

7. The computer-implemented method of claim 1, wherein the location database is a back-end location database accessible via a network.

8. The computer-implemented method of claim 1, wherein the location information in the location report comprises Global Positioning System (GPS) coordinates.

9. A system for monitoring locations for a plurality of entities that are grouped into a plurality of clusters, the system comprising:
   one or more processors; and
   a non-transitory machine-readable medium comprising instructions stored therein, which when executed by the one or more processors, cause the one or more processors to perform operations comprising:

receiving a location report for a first entity, the location report comprising location information for the first entity;

determining whether the first entity is a leader entity or a follower entity;

updating a location database using the location information from the location report for the first entity when the first entity is the leader entity; and storing, in a local cache, displacement information for the first entity that is indicative of a location of the first entity relative to an associated leader entity when the first entity is the follower entity, the displacement information being determined based at least in part on the location information in the location report and leader location information for the associated leader entity.

10. The system of claim 9, wherein the location report for the first entity further comprises an entity identifier for the first entity, and wherein determining whether the first entity is the leader entity or the follower entity comprises searching an affiliation table using the entity identifier.

11. The system of claim 9, wherein when the first entity is the follower entity, the operations further comprise:

identifying the associated leader entity that is associated with the first entity;

determining the leader location information for the associated leader entity; and calculating the displacement information for the first entity based on the leader location information for the associated leader entity and the location information from the location report for the first entity.

12. The system of claim 9, wherein when the first entity is the follower entity, the operations further comprise:

receiving another location report for the first entity, the another location report comprising another location information for the first entity;

identifying the associated leader entity that is associated with the first entity;

retrieving the leader location information for the associated leader entity and the displacement information for the first entity;

calculating a predicted location for the first entity based on the leader location information for the associated leader entity and the displacement information for the first entity;

comparing the predicted location for the first entity and the another location indicated by the another location information from the another location report for the first entity; and when a distance between the predicted location for the first entity and the another location for the first entity exceeds a threshold distance, converting the first entity into another leader entity and transmitting the location information from the location report for the first entity to the location database.

13. The system of claim 12, wherein when the distance between the predicted location for the first entity and the another location for the first entity does not exceed the threshold distance, the operations further comprise:

discarding the another location report for the first entity.

14. The system of claim 12, wherein converting the first entity into the another leader entity comprises:

locating an entry for the first entity in an affiliation table; and updating the affiliation table to indicate that the first entity is the another leader entity.

15. A non-transitory machine-readable medium comprising instructions stored therein, which when executed by a machine, cause the machine to perform operations comprising:

receiving a location report for a first entity, the location report comprising location information for the first entity and an entity identifier for the first entity;

searching an affiliation table using the entity identifier to determine whether the first entity is a leader entity or a follower entity;

transmitting, via a network, the location information in the location report for the first entity to a location database to be stored when the first entity is the leader entity; and storing, in a local cache, displacement information for the first entity that is indicative of a location of the first entity relative to a first leader entity of a first cluster comprising the first entity when the first entity is the follower entity, wherein the displacement information is determined based at least in part on the location information in the location report and leader location information for the first leader entity.

16. The non-transitory machine-readable medium of claim 15, wherein when follower entity, the operations further comprise:

identifying the first leader entity of the first cluster comprising the first entity;

determining the leader location information for the first leader entity; and calculating the displacement information for the first entity based on the leader location information for the first leader entity and the location information in the location report for the first entity.

17. The non-transitory machine-readable medium of claim 15, wherein the network is an intranet.

18. A computer-implemented method for forming a cluster of entities, the method comprising:

identifying, in a geographic region, a first leader entity associated with a first cluster comprising a first follower entity and a second leader entity associated with a second cluster comprising a second follower entity, wherein leader location information for the first and second leader entities is stored in a database and displacement information for the first and second follower entities is stored in a local cache;

determining a first trajectory for the first leader entity and a second trajectory for the second leader entity;

comparing the first trajectory with the second trajectory; and when a difference between the first trajectory and the second trajectory is less than a threshold trajectory difference, combining the first cluster associated with the first leader entity and the second cluster associated with the second leader entity.

19. The computer-implemented method of claim 18, further comprising partitioning a geographic area into a number of geographic regions, wherein entities identified in a same geographic region are considered within a geographic proximity of one another.

20. The computer-implemented method of claim 18, wherein combining the first cluster associated with the first leader entity with the second cluster associated with the second leader entity comprises:

locating an entry for the first leader entity in an affiliation table; and updating the entry for the first leader entity to indicate that the first leader entity is a third follower entity of the second leader entity.

21. The computer-implemented method of claim 20, wherein combining of the first cluster associated with the first leader entity with the second cluster associated with the second leader entity further comprises:
- locating another entry for the first follower entity of the first leader entity in the affiliation table; and
- updating the another entry for the first follower entity of the first leader entity to indicate that the follower entity of the first leader entity is a fourth follower entity of the second leader entity.

22. A system for forming a cluster of entities, the system comprising:
- one or more processors; and
- a non-transitory machine-readable medium comprising instructions stored therein, which when executed by the one or more processors, cause the one or more processors to perform operations comprising:
  - identifying a first leader entity associated with a first cluster comprising a first follower entity and a second leader entity associated with a second cluster comprising a second follower entity within a geographic proximity, wherein leader location information for the first and second leader entities is stored in a database and displacement information for the first and second follower entities is stored in a local cache;
  - determining a first trajectory for the first leader entity and a second trajectory for the second leader entity;
  - comparing the first trajectory with the second trajectory; and
  - when a difference between the first trajectory and the second trajectory is less than a threshold trajectory difference, merging the first cluster associated with the first leader entity and the second cluster associated with the second leader entity.

23. The system of claim 22, wherein the identifying of the first leader entity and the second leader entity within the geographic proximity comprises:
- partitioning a geographic area into a number of geographic regions, wherein first leader entity and the second leader entity are located in a same geographic region.

24. The system of claim 22, wherein merging the first cluster associated with the first leader entity with the second cluster associated with the second leader entity comprises:
- locating an entry for the first leader entity in an affiliation table; and
- updating the entry for the first leader entity to indicate that the first leader entity is a third follower entity of the second leader entity.

25. The system of claim 22, wherein the first trajectory for the first leader entity and the second trajectory for the second leader entity are velocities.

26. A non-transitory machine-readable medium comprising instructions stored therein, which when executed by a machine, cause the machine to perform operations comprising:
- identifying a plurality of leader entities in a region, each of the plurality of leader entities being associated with one of a plurality of clusters and one of a plurality of trajectories, and each of the plurality of clusters comprising at least one follower entity, wherein leader location information for the plurality of leader entities is stored in a database and displacement information for the at least one follower entity of each of the plurality of clusters is stored in a local cache that is distinct from the database;
- comparing a first trajectory of a first leader entity of the plurality of leader entities with a second trajectory of a second leader entity of the plurality of leader entities; and
- when a difference between the first trajectory and the second trajectory is less than a trajectory deviation value, merging a first cluster associated with the first leader entity with a second cluster associated with the second leader entity.

27. The non-transitory machine-readable medium of claim 26, wherein the operations further comprise:
- calculating the first trajectory for the first leader entity based on a first location history for the first leader entity; and
- calculating the second trajectory for the second leader entity based on a second location history for the second leader entity.

28. The non-transitory machine-readable medium of claim 26, wherein the operations further comprise:
- partitioning a geographic area into a number of geographic regions, wherein entities identified in a same geographic region are considered within a geographic proximity of one another.

* * * * *